3,788,842
PROCESS FOR RECOVERING MERCURY
Gerhard Nolte and Hans Rabowsky, Hurth-Knapsack, Johannes Krause, Hurth-Hermulheim, and Hans-Dieter Narres, Cologne-Bickendorf, Germany, assignors to Knapsack Aktiengesellschaft, Knapsack, near Cologne, Germany
No Drawing. Filed Jan. 21, 1972, Ser. No. 219,842
Claims priority, application Germany, Jan. 22, 1971, P 21 02 900.5
Int. Cl. C22b 3/00
U.S. Cl. 75—109
12 Claims

ABSTRACT OF THE DISCLOSURE

Mercury is recovered in metallic form from an aqueous solution, particularly from a salt brine, having mercury compounds therein. To this end, the solution or brine is treated with an iron-containing alloy, the potential of which, determined in the solution or brine, is by at least 100 millivolts more positive than that of iron.

---

The present invention relates to a process for recovering mercury in metallic form from aqueous solutions, particularly from salt brines, containing mercury compounds.

In a plurality of chemical production processes including, for example, the electrolysis of alkali metal chlorides by amalgamation, it is sometimes necessary to discharge aqueous solutions having dissolved mercury therein. The loss of mercury which is caused thereby is highly undesirable firstly because of environmental control in view of the strong toxicity of mercury salts, and secondly because of the relatively high price of mercury. Various processes for isolating mercury from such solutions have already been described.

In the process of U.S. Pat. 3,085,859, the aqueous solution with the mercury therein is caused to travel through a column having a strongly alkaline, insoluble anion exchanger therein, and the anion exchanger loaded with mercury salts is subsequently washed using an excess of an aqueous alkali metal sulfide solution.

As reported in U.S. Pat. 3,039,865, waste brine coming from an electrolytic cell and having between 1 and 550 p.p.m. (p.p.m. stands for parts per million) of mercury in the form of soluble salts therein is treated so as to establish a pH value between 5 and 11 and conveyed over a waterproof metal reductor predominantly comprised of iron or zinc, with the resultant formation of metallic mercury, which is obtained in the form of a sludge contaminated with solid matter.

It has also been proposed earlier to precipitate the mercury in sulfide form.

These earlier processes are, however, not fully satisfactory.

U.S. Pat. 3,089,859, for example, describes a costly two step process. Despite this, metallic mercury is not obtained, nor is metallic mercury obtained by precipitation with the use of sulfide ions.

A non-beneficial effect of the so-called cementation disclosed in U.S. Pat. 3,039,865, for example, resides in the fact that mercury ions are reduced together with hydrogen ions. As a result of this, a considerable proportion of metal is dissolved and thereby prevented from contributing to the precipitation of mercury. This effects a strong concentration of foreign metals in the solution, which handicap the recovery of mercury as the dissolved foreign metal undergoes conversion to muddy aquoxides, which have a large inner surface area and accordingly a high adsorption power. As a result, the precipitated mercury, which can be isolated, is so strongly contaminated that it does not flow together to form droplets. It is rather obtained in the form of a non-glossy greyish-brown mass. In addition thereto, the precipitated mercury is found partially to adhere tenaciously to the metal surface, whereby further reaction thereof is rendered more difficult or partially rendered impossible.

It is an object of the present invention to provide a one step process permitting substantially pure mercury to be recovered fairly completely from solutions having mercury compounds therein, which process comprises subjecting the said solutions to treatment with one or more iron-containing alloys, the potential of the alloys, determined in these solutions, being by at least 100 millivolts more positive than that of iron.

Further preferred features of the process of the present invention, which can be used singly or in combination, provide:

(a) for the solutions to be treated so as to establish a pH value between 0 and 7, preferably between 1 and 5 therein;

(b) for the iron-containing alloy to be used in the form of turnings;

(c) for the turnings to be degreased in conventional manner prior to using them;

(d) for the use of a stainless steel containing between 10 and 26 percent of chromium, between 8 and 26 percent of nickel, between 0 and 5 percent of molybdenum and between 0 and 3 percent of copper, the balance being iron, as the iron-containing alloy;

(e) for the use of a stainless steel containing between 16 and 19 percent of chromium, between 10 and 13 percent of nickel and between 2 and 3 percent of molybdenum (German Industrial Standard 1.4571), the balance being iron;

(f) for the use of stainless steel containing between 17 and 19 percent of chromium and between 8 and 11 percent of nickel (German Industrial Standard 1.4541), the balance being iron;

(g) for the use of stainless steel containing between 16 and 19 percent of chromium, between 19 and 21 percent of nickel, between 2 and 3 percent of molybdenum and between 1.5 and 2.5 percent of copper (German Industrial Standard 1.4506), the balance being iron.

If use is made of an iron alloy containing chromium and nickel as its principal constituents, if desired together with molybdenum or together with molybdenum and copper, it is found that hydrogen ions practically cease to undergo reduction in the aqueous solutions which have mercury compounds therein and are acidified by means of a mineral acid, such as hydrochloric acid, sulfuric acid or phosphoric acid, for example. As a result of this, it is firstly unnecessary continuously to replace the acid consumed and secondly the consumption of the iron-containing alloy is reduced to a minimum bearing in mind that merely one gram atom of iron or one gram atom of the alloy constituents, such as chromium, nickel and similar constituents, which appear in the $\gamma$-mixed crystal, are dissolved, per gram atom of precipitated mercury. The process of the present invention more particularly enables mercury to be recovered, except for a proportion of less than 1 p.pm., from aqueous solutions, and enables use to be made of a starting solution with relatively low proportions of mercury, for example between 20 and 40 milligrams/liter, therein.

We have unexpectedly discovered that the mercury is precipitated in a form in which it is easy to isolate if use is made of the iron-containing and degreased alloys specified hereinabove. The mercury is more particularly obtained as a pulverulent grey material which very loosely adheres to the iron-containing alloy, is easy to remove therefrom by washing, and readily deposits in the solution because of the large difference in density, or it is sometimes obtained in the form of liquid droplets which flow together.

The mercury so obtained is substantially free from contaminants and therefore easy to purify completely by distillation.

The solution subjected to the above treatment is practically free from mercury and may well be discarded as waste effluent, following the isolation of minor proportions of heavy metal ions, such as $Fe^{++}$, $Cr^{++}$, $Ni^{++}$ and similar ions, by alkaline precipitation.

The following examples further illustrate the process of the present invention.

EXAMPLE 1

A condensate (4 liters), which was exhausted from the cells used for the electrolysis of alkali metal chlorides by the amalgamation process and which was practically free from alkali metal chlorides, was treated with hydrochloric acid so as to establish a pH value of 2 therein and further treated with 660 grams of degreased turnings of an iron alloy (stainless steel; German Industrial Standard 1.4571) which inter alia contained 17 percent of chromium and 11.5 percent of nickel. The potential of the alloy used, determined in the condensate, was by 350 millivolts more positive than that of iron.

After various reaction times, solution samples were taken, filtered and analyzed. The following values (milligrams/liter) were obtained.

| | Hg | Fe | Cr | Ni |
|---|---|---|---|---|
| Reaction time (hrs.): | | | | |
| 0 | 1,160 | | | |
| 2 | 860 | | | |
| 6 | 27 | | | |
| 8.5 | 1.3 | | | |
| 24.5 | 0.4 | | | |
| 100 | 0.1 | 370 | 32 | 20 |

By shaking, the precipitated mercury was easy to remove from the turnings and it accumulated at the bottom of the container. The quantity of mercury obtained was dried and weighed. 4680 milligrams were found to have been obtained, compared with the 4640 milligrams of Hg initially present in the solution. In other words, the precipitated mercury merely contained approximately 1 percent of contaminants.

EXAMPLE 2

A brine (3 liters), which contained 60 grams of NaCl/liter and came from the electrolysis of alkali metal chlorides by the amalgamation process, was treated with hydrochloric acid so as to establish a pH value of 2 and further treated with 200 grams of turnings the same as those used in Example 1. The potential of the alloy used, determined in the brine, was by 350 millivolts more positive than that of iron.

After various reaction times, solution samples were taken, filtered and analyzed. The following values (milligrams/liter) were obtained.

| | Hg | Fe | Cr | Ni |
|---|---|---|---|---|
| Reaction time (hrs.): | | | | |
| 0 | 864 | | | |
| 2 | 197 | | | |
| 4 | 64 | | | |
| 6 | 40 | | | |
| 24 | 2.1 | 295 | 73 | 53 |
| 95 | 0.3 | 328 | 90 | 69 |

EXAMPLE 3

A brine (3 liters), which contained 70 grams of NaCl/liter, was treated with hydrochloric acid so as to establish a pH value of 4 therein and treated further with 200 grams of degreased turnings the same as those used in Example 1. The potential of the alloy used, determined in the brine, was by 405 millivolts more positive than that of iron.

After various reaction times, solution samples were taken, filtered and analyzed. The following values (milligrams/liter) were obtained.

Reaction time (hrs.): Hg
0 _____ 73
2 _____ 26
20 _____ 0.8
90 _____ 0.3

What is claimed is:

1. A process for recovering mercury in metallic form from aqueous solutions having mercury compounds therein, which comprises establishing a pH value between 1 and 5 in the said solutions and treating them with a stainless steel containing between 10 and 26 percent of chromium, between 8 and 26 percent of nickel, between 0 and 5 percent of molybdenum and between 0 and 3 percent of copper, the balance being iron, the said stainless steel having a potential at least 100 millivolts more positive than that of iron, determined in the said solutions.

2. The process as claimed in claim 1, wherein the stainless steel contains between 16 and 19 percent of chromium, between 10 and 13 percent of nickel and between 2 and 3 percent of molybdenum, the balance being iron.

3. The process as claimed in claim 1, wherein the stainless steel contains between 17 and 19 percent of chromium and between 8 and 11 percent of nickel, the balance being iron.

4. The process as claimed in claim 1, wherein the stainless steel contains between 16 and 19 percent of chromium, between 19 and 21 percent of nickel, between 2 and 3 percent of molybdenum and between 1.5 and 2.5 percent of copper, the balance being iron.

5. The process as claimed in claim 1, wherein the stainless steel is used in the form of turnings.

6. The process as claimed in claim 5, wherein the turnings are degreased prior to using them.

7. A process for recovering mercury in metallic form from salt brines having mercury compounds therein, which process comprises establishing a pH value between 1 and 5 in the said salt brines and treating them with a stainless steel containing between 10 and 26 percent of chromium, between 8 and 26 percent of nickel, between 0 and 5 percent of molybdenum and between 0 and 3 percent of copper, the balance being iron, the said stainless steel having a potential at least 100 millivolts more positive than that of iron, determined in these salt brines.

8. The process as claimed in claim 7, wherein the stainless steel is used in the form of turnings.

9. The process as claimed in claim 8, wherein the turnings are degreased prior to using them.

10. The process as claimed in claim 7, wherein the stainless steel contains between 16 and 19 percent of chromium, between 10 and 13 percent of nickel and between 2 and 3 percent of molybdenum, the balance being iron.

11. The process as claimed in claim 7, wherein the stainless steel contains between 17 and 19 percent of chromium and between 8 and 11 percent of nickel, the balance being iron.

12. The process as claimed in claim 7, wherein the stainless steel contains between 16 and 19 percent of chromium, between 19 and 21 percent of nickel between 2 and 3 percent of molybdenum and between 1.5 and 2.5 percent of copper, the balance being iron.

References Cited
UNITED STATES PATENTS 3,039,865   6/1962   Gilbert et al. _____ 75—109 X
3,029,143   4/1962   Karpiuk et al. _____ 75—109

HERBERT T. CARTER, Primary Examiner

U.S. Cl. X.R.
75—121